(12) United States Patent
Edwards et al.

(10) Patent No.: US 11,868,474 B2
(45) Date of Patent: Jan. 9, 2024

(54) SECURING NODE GROUPS

(71) Applicant: Hewlett Packard Enterprise Development LP, Houston, TX (US)

(72) Inventors: Nigel Edwards, Bristol (GB); Michael R. Krause, Boulder Creek, CA (US); Melvin Benedict, Magnolia, TX (US); Ludovic Emmanuel Paul Noel Jacquin, Bristol (GB); Luis Luciani, Tomball, TX (US); Thomas Laffey, Roseville, CA (US); Theofrastos Koulouris, Bristol (GB); Shiva Dasari, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 476 days.

(21) Appl. No.: 17/280,507

(22) PCT Filed: Jan. 8, 2019

(86) PCT No.: PCT/US2019/012610
§ 371 (c)(1),
(2) Date: Mar. 26, 2021

(87) PCT Pub. No.: WO2020/145944
PCT Pub. Date: Jul. 16, 2020

(65) Prior Publication Data
US 2022/0043914 A1 Feb. 10, 2022

(51) Int. Cl.
*G06F 21/00* (2013.01)
*G06F 21/57* (2013.01)
(Continued)

(52) U.S. Cl.
CPC .............. *G06F 21/57* (2013.01); *G06F 21/32* (2013.01); *H04L 9/0816* (2013.01); *H04L 9/3226* (2013.01)

(58) Field of Classification Search
None
See application file for complete search history.

(56) References Cited

U.S. PATENT DOCUMENTS

| 8,738,894 B2 | 5/2014 | Batke et al. |
| 9,998,438 B2 | 6/2018 | Sinha et al. |

(Continued)

OTHER PUBLICATIONS

Lorch, Markus et al. A hardware-secured credential repository for Grid PKIs. IEEE International Symposium on Cluster Computing and the Grid, 2004. CCGrid 2004. https://ieeexplore.ieee.org/stamp/stamp.jsp?tp=&arnumber=1336679 (Year: 2004).*

(Continued)

*Primary Examiner* — Jeremiah L Avery
(74) *Attorney, Agent, or Firm* — Hewlett Packard Enterprise Patent Department

(57) ABSTRACT

A method for securing a plurality of compute nodes includes authenticating a hardware architecture of each of a plurality of components of the compute nodes. The method also includes authenticating a firmware of each of the plurality of components. Further, the method includes generating an authentication database comprising a plurality of authentication descriptions that are based on the authenticated hardware architecture and the authenticated firmware. Additionally, a policy for securing a specified subset of the plurality of compute nodes is implemented by using the authentication database.

20 Claims, 10 Drawing Sheets

(51) Int. Cl.
*G06F 21/32* (2013.01)
*H04L 9/08* (2006.01)
*H04L 9/32* (2006.01)

(56) References Cited

U.S. PATENT DOCUMENTS

| | | | |
|---|---|---|---|
| 10,771,264 B2 | 9/2020 | Edwards et al. | |
| 11,750,412 B2* | 9/2023 | Ansari | H04L 65/1101 709/225 |
| 2005/0278775 A1 | 12/2005 | Ross | |
| 2006/0200859 A1 | 9/2006 | England et al. | |
| 2011/0185181 A1 | 7/2011 | Lin | |
| 2014/0109076 A1* | 4/2014 | Boone | H04L 63/105 717/170 |
| 2014/0365755 A1 | 12/2014 | Liu et al. | |
| 2014/0380425 A1* | 12/2014 | Lockett | G06F 21/00 726/4 |
| 2015/0052596 A1* | 2/2015 | Ayanam | H04W 4/38 726/8 |
| 2015/0095648 A1* | 4/2015 | Nix | H04L 9/0894 713/170 |
| 2016/0371493 A1 | 12/2016 | Gyan et al. | |
| 2017/0010899 A1* | 1/2017 | Dasar | G06F 8/654 |
| 2017/0195124 A1* | 7/2017 | Obaidi | H04L 9/0861 |
| 2017/0201545 A1 | 7/2017 | Gaver et al. | |
| 2018/0075242 A1* | 3/2018 | Khatri | H04L 9/3263 |
| 2023/0106581 A1* | 4/2023 | Sood | H04L 63/166 709/203 |

OTHER PUBLICATIONS

Park, Jin Hyung et al. Security Architecture for a Secure Database on Android. IEEE Access, vol. 6. https://ieeexplore.ieee.org/stamp/stamp.jsp?tp=&arnumber=8271994 (Year: 2018).*
Kurachi, Ryo et al. Improving secure coding rules for automotive software by using a vulnerability database. 2018 IEEE International Conference on Vehicular Electronics and Safety (ICVES). https://ieeexplore.ieee.org/stamp/stamp.jsp?tp=&arnumber=8519496 (Year: 2018).*
B. Moran et al., "A Firmware Update Architecture for Internet of Things Devices," Mar. 2, 2018, 17 Pgs. Retrieved Aug. 10, 2018.
Cisco, "Cisco Trust Anchor Technologies," Data Sheet, 2015, 5 Pgs.
Dave Heller et al, "Using Trusted Boot on IBM OpenPOWER Servers," Feb. 17, 2017, 16 Pgs., Retrieved Aug. 10, 2018.
Arthur et al., "A Practical Guide to TPM 2.0", ApressOpen, 2015, 375 pages.
Google Cloud, "Titan in Depth: Security in Plaintext", available online at <https://cloud.google.com/blog/products/identity-security/titan-in-depth-security-in-plaintext>, Aug. 25, 2017, 6 pages.
IEEE Standard Association, "IEEE Standard for Local and Metropolitan Area Networks—", Secure Device Identity, IEEE Std 802.1AR™-, 2018, 73 pages.
Intel, "PCI Express Device Security Enhancements", version 0.7, Jun. 2018, 44 pages.
International Search Report and Written Opinion received for PCT Patent Application No. PCT/US19/12610, dated Oct. 7, 2019, 10 pages.
Kelly et al., "Project Cerberus Security Architecture Overview Specification", Open Compute Project, Microsoft Corporation, 2017, 17 pages.
Security Boulevard, "Implicit Identity Based Device Attestation", TCG Admin, available online at <https://securityboulevard.com/2018/03/implicit-identity-based-device-attestation/>, Mar. 5, 2018, 6 pages.
TCG, "TCG Platform Attribute Credential Profile", Specification Version 1.0, Revision 16, Jan. 16, 2018, 43 pages.
TCG, "TPM Keys for Platform DevID for TPM2", Specification Version 0.7, Revision 45, Dec. 12, 2018, 62 pages.
USB Type-C Authentication Specification, "Universal Serial Bus Type-C™ Authentication Specification", Revision 1.0 with ECN and Errata, Jul. 24, 2017, pp. 1-66.

* cited by examiner

SECURING NODE GROUPS

BACKGROUND

Within a chassis or enclosure of a compute node, a computer system, or host, there may be hundreds of pluggable components, from temperature sensors and power supplies to memory modules and processors. Within a rack or a cluster of compute nodes, there may be thousands of such components. However, each component may represent a security vulnerability, i.e., a potential attack vector. A component may be a potential attack vector if the component is counterfeit or contains malware that may compromise the compute node. One potential way to compromise a component is to corrupt the firmware that is used to operate the component. Even simple components, such as fans and sensors, if compromised, can cause damage to a compute node through overheating or fire. Hence, identifying compromised components may be useful for preventing the components' misuse.

BRIEF DESCRIPTION OF THE DRAWINGS

The present disclosure may be understood from the following detailed description when read with the accompanying Figures. In accordance with the standard practice in the industry, various features are not drawn to scale. In fact, the dimensions of the various features may be arbitrarily increased or reduced for clarity of discussion.

Some examples of the present application are described with respect to the following figures.

DETAILED DESCRIPTION

Figure 1:
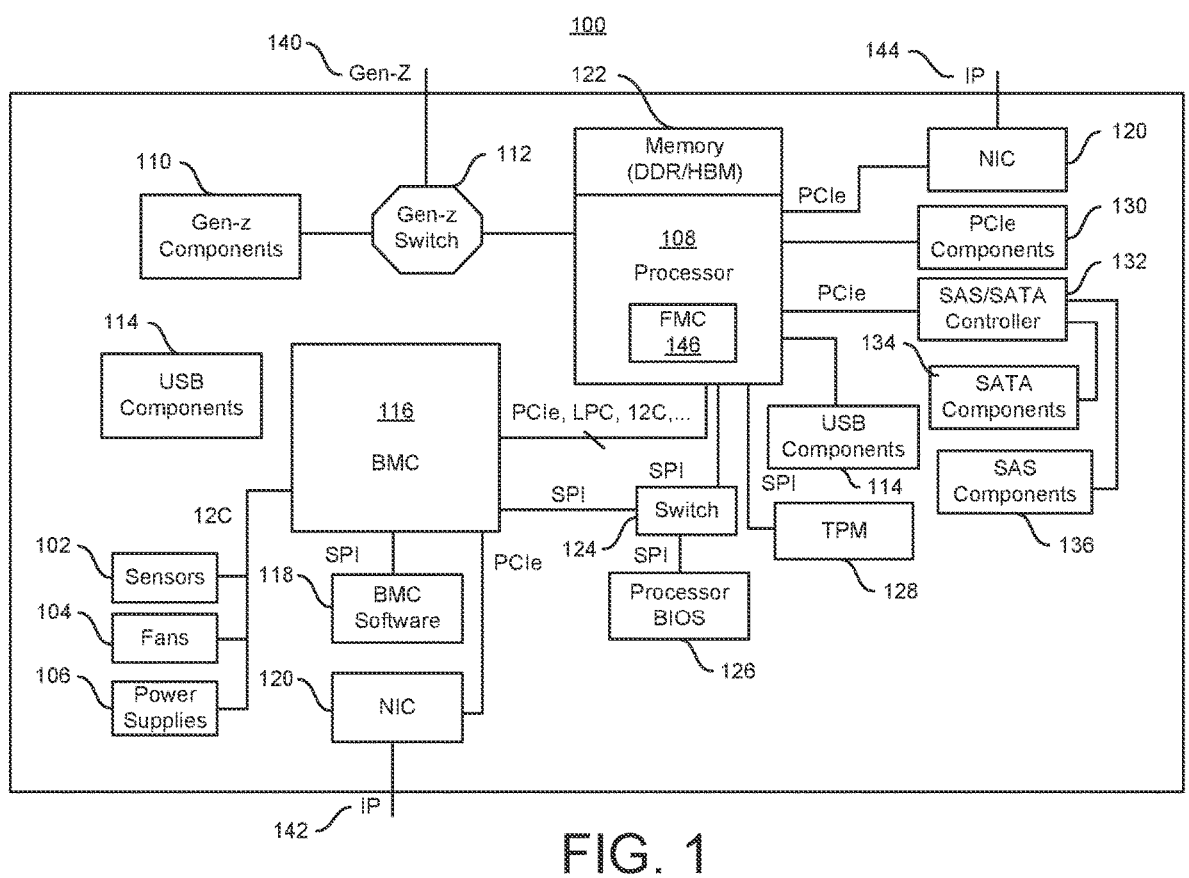
FIG. 1 is an example compute node of a node group that may be secured.

Examples of authentication include universal serial bus (USB) Type C authentication, which enables a compute node, i.e., a host, to authenticate compliant USB components. USB Type C authentication also forms the basis for potential peripheral component interconnect express (PCIe) authentication mechanisms, which allow PCIe components to be authenticated. The pattern of authentication in USB Type C and PCIe can be extended to internal buses, and other protocols and interconnects.

The purpose of component authentication is to establish trust in the component. The authentication mechanisms discussed above may establish that the hardware of the component is from a known and trusted manufacturer. However, establishing that a component is from a known and trusted manufacturer does not mean that the firmware running inside the component is correct and trustworthy. Being correct may mean that the correct firmware and the correct version of the firmware are installed in the component. Being trustworthy may mean that the firmware can be trusted not to breach the security of the component on which the firmware is running.

Additionally, while the authentication of each component may be challenging, the challenge may be greater when considering that multiple components may be included in one compute node. Further, compute nodes may be combined into node groups, such as a chassis enclosure with two compute nodes, or a rack system with all the compute nodes in a rack of blade servers. Node groups may also include node clusters, which may include hundreds of compute nodes or more, which may include tens of thousands of components.

However, such a scale may introduce additional challenges. For example, at the node cluster scale, the collective rate at which components fail and are replaced may be such that the system configurations of many compute nodes, even of the same type and from the same manufacturer, may vary from their original factory setups. Accordingly, attempting to use automated methods to authenticate the component and verify the firmware of the components in a cluster may be challenging. The varying configurations may reduce assumptions that may be made about the original factory setups at the cluster scale. Thus, automated methods, which may be more efficient if such assumptions could be made at the cluster scale may not be useful. Rather, authentication and verification may become customized, which may be tedious and costly.

Further, in a node cluster, different compute nodes with the same hardware components may run different versions of firmware at any given time. For example, as a practical consideration, firmware updates for the components may be carried out in a staged fashion. This may ensure the availability of the node cluster even when some components are unavailable due to firmware updates. Thus, different sets of components may have different versions of firmware until all the stages of a firmware update in the node cluster is complete. Additionally, the same types of components from the same manufacturer may arrive with different versions of factory-installed firmware, whether initially installed or replaced. Additionally, a node cluster is a complex computer system, whereby higher-level data center and node cluster management systems may be tasked with creating logical pools of resources from the physical collections of components present in a node cluster. As such, this may lead to some parts of the node cluster being reconfigured, rebooted or taken offline more often than others. In some scenarios, rebooting and taking compute nodes offline may be opportunities when the components on a compute node are authenticated, or updated with new versions of firmware. Thus, if different compute nodes within a node cluster reboot or go offline at different times, the components on those compute nodes may end up with different versions of firmware, some of which may be compromised.

Accordingly, in examples of the present disclosure, a node cluster-scale component authentication and verification system may be provided to dynamically manage such discrepancies at scale by providing the abilities to identify, report, and manage components on groups of nodes according to specified policies. In this way, the component authentication and verification system may identify components within node groups that may be running vulnerable or defective versions of firmware.

FIG. 1 is an example compute node 100 of a node group that may be secured. The node group may be authenticated by ensuring the components of each of the example compute nodes 100 in the node group are trustworthy. The example compute node 100 includes multiple components that may be authenticated along with the firmware installed on each of the components. Firmware may be computer instructions that operates the various components of the compute node 100. In examples, some components may be installed by a manufacturer of the compute node 100. Additionally, some components may be field replaceable, meaning the components are replaced after purchase of the compute node 100 by installing the components on the compute node 100 when the compute node 100 is powered off. Further, some components may be hot-plugged. Being hot-plugged means that the component is physically connected to an interconnect of the compute node 100 while the compute node 100 is powered on. The compute node 100 may include components with a range of capabilities, including components with little to no processing ability, such as sensors 102, fans 104, and power supplies 106, and components with complex processing capabilities, such as a general-purpose processor 108. Additional components of the compute node 100 may include, for example, Gen-Z components 110, a Gen-Z switch 112, USB components 114, a baseboard management controller (BMC) 116, BMC software 118, multiple network interface controllers (NICs) 120, memory 122, a serial peripheral interconnect (SPI) switch 124. The SPI switch 124 may be in the bus that is used to access read-only memory (ROM). The SPI switch 124 may enable the BMC 116 to check if the general-purpose processor 108 is loading the correct firmware. For example, The SPI switch 124 may enable the BMC 116 to read the basic input output system (BIOS) 126, before the BIOS 126 is loadable by the processor 108. If the BIOS 126 is correct, the BMC 116 may flip the switch to allow the processor 108 to load the BIOS 126. The SPI switch 124 may also enable the BMC 116 to restore or update BIOS 126. Further, the components may include the BIOS 126, a trusted platform module 128, PCIe components 130, a serial attached SCSI (SAS)/SATA controller 132, SATA components 134, and SAS components 136. These components may also be connected over a range of interconnects, including inter-integrated circuit (I2C), PCIe, USB, double data rate (DDR), high bandwidth memory (HBM), and Gen-Z, within the compute node 100.

The example compute node 100 may be a network switch, router, network server, and the like. As such, the components of the example compute node 100 may vary, including fewer or additional components. For example, the compute node 100 may include multiple processors 108, or a platform controller hub. Additionally, a compute node 100 may include one or more processors 108 but not the BMC 116. Accordingly, authentication and verification may be conducted out-of-band via the BMC 116. Alternatively, authentication and verification may be conducted in-band via the processor 108.

In examples of the present disclosure, one or more of the components of the system 100 may include firmware measurement certificates 146, which may be used to authenticate that the firmware for the components of the compute node are correct and trustworthy. The firmware measurement certificates 146 may provide trustworthy measurements of the firmware running on the components. A measurement is the value of binary image of the firmware that is loaded into memory for execution. Thus, an example authentication and verification system may use the firmware measurement certificates 146 to determine if the associated components are running firmware according to the manufacturers' specifications, or if the firmware may be compromised. The example compute node 100 may communicate with other compute nodes in the same node group, or on different networks, across Gen-Z or IP networks. For example, authentication and verification of components may be managed from outside the compute node 100, on a rack, node cluster, or fabric management system. Authentication managed from outside of the compute node 100 may take place over a Gen-Z interconnect 140, or IP networks 142, 144.

The hardware and firmware of the components may be authenticated in response to a request from an authentication initiator, also referred to herein as the initiator. The initiator may authenticate a computer component, e.g., the USB components 114, by executing a series of calls to the component, also referred to herein as a responder. Examples of initiators may include software or firmware executing on the compute node 100. Example initiators may include an operating system executing on the processors 108, and the firmware of the BMC 116.

Figure 2:
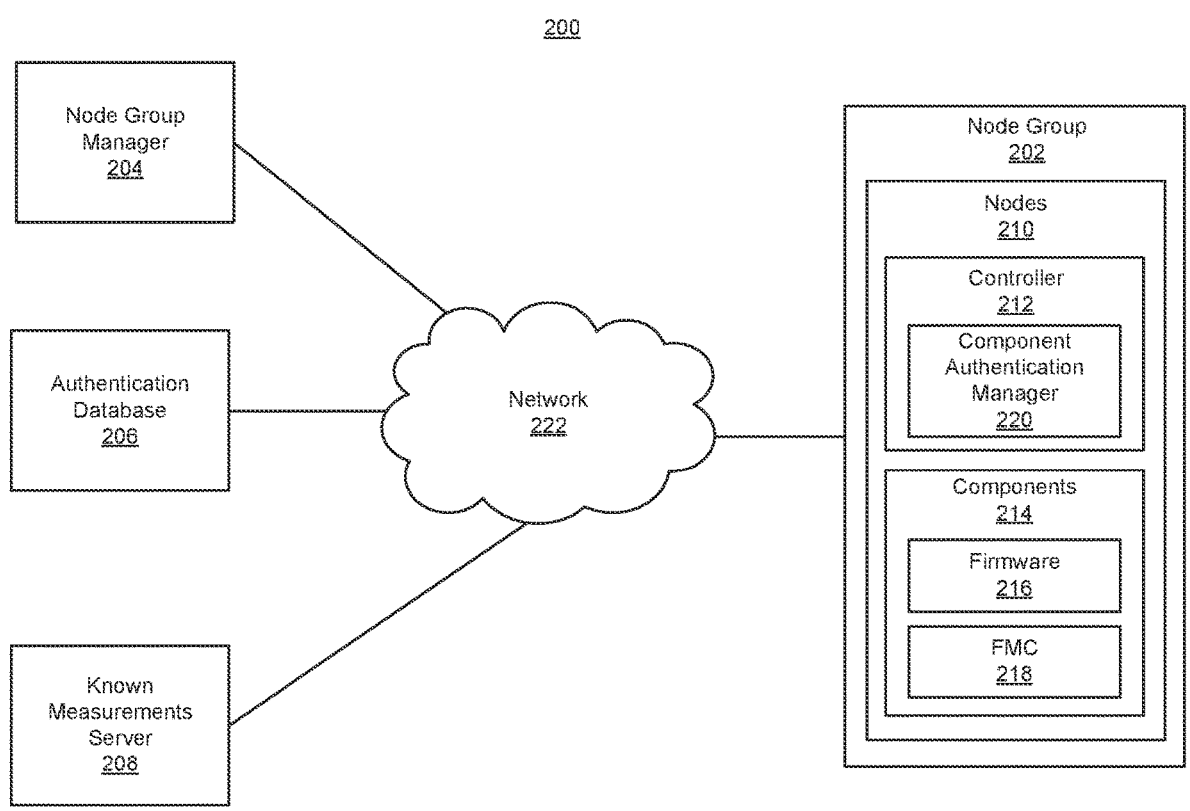
FIG. 2 is an example system for securing node groups.

FIG. 2 is an example system 200 for securing node groups. The example system 200 may include a node group 202, a node group manager 204, an authentication database 206, and a known measurements server 208. The node group 202 may be a chassis enclosure, a rack, a node cluster, or other grouping of compute nodes. The node group 202 may include multiple nodes 210, which may be compute nodes, such as switches, routers, blade servers, and the like. The nodes 210 may include a controller 212 and one or more components 214. The components 214 may include various compute node components, such as the components described with respect to FIG. 5. The components may include firmware 216 and one or more firmware measurement certificates (FMCS) 218. The firmware 216 may be the instructions installed on the component 214 that operate the component 214. The FMC 218 may be similar to a digital certificate, which is an electronic document that may be distributed by an issuing authority. Digital certificates may ensure the trustworthiness of a component 214, a compute node 210, and the like. The firmware measurement certificate 218 may enable the component authentication manager 220 to ensure the trustworthiness of the firmware 216 by providing an accurate measurement of the firmware 216 that is loaded in memory for operating the component 214. In examples, the measurements in the firmware measurement certificates 218 may be compared to measurements in the known measurements server 208. The known measurements server 208 may include measurements of the firmware provided by the component manufacturers, indicating the measurements of the binary image of the firmware that is installed on component 214 during manufacture, or during a legitimate update from the manufacturer. Thus, the comparison may be useful in determining whether the firmware 216 is trustworthy or compromised.

The controller 212 may be a BMC or a processor, such as the BMC 116 and processor 108. Example nodes 210 may include multiple controllers 212, including combinations of BMCs and processors. The controller 212 includes a component authentication manager 220, which may be firmware that performs authentications of the components 214 on all of the nodes 212 of the group when the controller 212 powers up, exits a low-power state, or on demand. The component authentication manager 220 may perform authentication of the hardware of the component 214, and the firmware 216. Thus, the controller 212 may represent an initiator, and the components may represent the responders. In examples, the controller 212 may authenticate itself and another controller 212. For example, the BMC 116 may authenticate itself, another BMC 116, and the processors 108.

The component authentication manager 220 may also provide an API of operations that may be used to execute authentications of individual or groups of components 214. Further, when performing authentications, the component authentication manager 220 may store details of the authentications in the authentication database 206. Details about the authentication may include, for example, when an authentication is performed. Details in an example node 210 may specify one or more interconnects: PCIe, low pin count (LPC), Inter-Integrated Circuit (I2C), between the processor 108 and the BMC 116 over which the authentication is performed. Accordingly, the API may be used to query the authentication database 206 for details about the authentications.

The node group manager 204 may verify the authentications of the components 214 in node groups 202 by issuing calls to the API of the component authentication manager 220. The node group manager 204 may issue these calls within scripts and computer programs that automatically enforce security policies for node groups 202 by checking, for example, if components' authentications are current. If the authentication is not current according to a security policy for the node group 202, the node group manager 204 may perform an authentication against one or more components 214. In another example, the node group manager 204 may use the component authentication manager 220 API to check if the authentication on a specific component 214 was performed over the same interconnect that the controller 212 is currently using to execute the firmware 216 of the component 214. If the authenticated interconnect is different from the current interconnect, the component 214 may be compromised. Accordingly, in such an example, the node group manager 204 may take additional steps to quarantine the potentially compromised component 214 according to predetermined security policies.

The node group 202, node group manager 204, authentication database 206 and known measurements server 208 may be in communication over a network 222. The network 222 may be a computer communication network or collection of networks, including a local area network, wide area network, the Internet, and the like.

Figure 3:
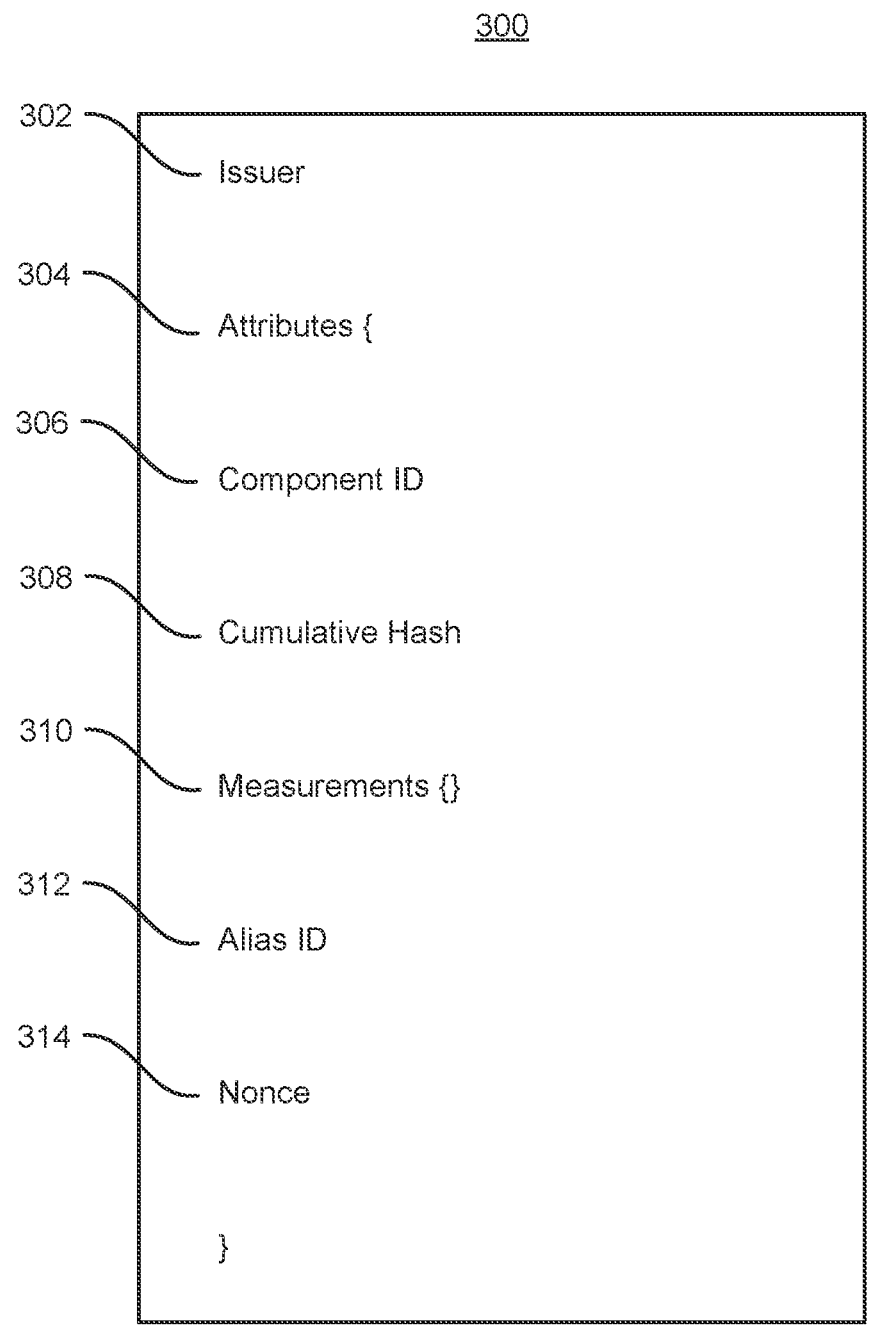
FIG. 3 is an example firmware measurement certificate for securing node groups.

FIG. 3 is an example firmware measurement certificate 300 in a system for securing node groups. The firmware measurement certificate 300 is an example of the firmware measurement certificate 218, which may be used for securing the firmware 216 of each of the components 214. Referring back to FIG. 3, the firmware measurement certificate 300 includes an issuer 302 and attributes 304. The issuer 302 may be the name of this issuer. This name may be associated with a public key that is signed by a certificate issued to the issuer, with the root being self-signed. The root certification authority key may be known. There may be no higher authority than the root certification authority, which represents a trust anchor that is known to the authentication initiator. The trust anchor may be represented in a local data store that identifies trustworthy certification authorities. For example, when identity certificates are used for a web browser, the web browser provider may configure trust anchors into the web browser before releasing it for general use. Similarly, the initiator may have trust anchors, i.e., one or more known root certification authorities that the manufacturer of the initiator trusts. The signature may be applied to the whole certificate but is a separate structure (not shown). In examples, the issuer 302 may represent a core root of trust or a specific layer of firmware 216. The attributes 304 may include a component ID 306, a cumulative hash 308, measurements 310, an alias ID 312, and a nonce 314. Similar to the subject of an identity certificate, the alias ID 312 may be a public key that identifies the owner of the firmware measurement certificate 300. The alias ID 312 may be authenticated by the initiator against the trust anchors. To limit the authentication of the firmware measurement certificate 300 to one layer of the firmware 216, the alias ID 312 may be rendered unusable to higher layers of the firmware 216. The component ID 306 identifies a public-private key pair assigned to the component 214. In examples, the component ID 306 may be used to sign the first firmware measurement certificate in the hierarchy, i.e., layer L0 of the firmware 216. The firmware measurement certificates 300 for multiple layers of firmware 216 may form a hierarchy, wherein each firmware measurement certificate 300 is issued by the alias ID in the firmware measurement certificate 300 for the previous layer of firmware 216. The component ID 306 may be used to sign the first firmware measurement certificate 300 in the hierarchy and subsequent firmware measurement certificates 300 may be signed by the alias ID 312 in the previous layer of the firmware 216. In examples, the component ID 306 may not be accessible outside the core root of trust.

The cumulative hash 308 may be cryptographic hash representation of all layers of firmware 216 up to the layer of firmware 216 being secured. An example equation for calculating the cumulative hash 308 over layers 0 through n of the firmware 216 is shown in Equation 1. In Equation 1, H_ represents a cumulative hash function, and H represents a hash function that is approved by the National Institute of Standards and Technology (NIST). Additionally, in Equation 1, the symbol, "$\|$" represents the concatenation of fields or functions.

$$H\_(L_0)=H(0\|H(L_0))$$

$$H\_(L_n)=H(H\_(L_{n-1})\|H(L_n)) \quad \text{EQUATION 1}$$

Figure 4:
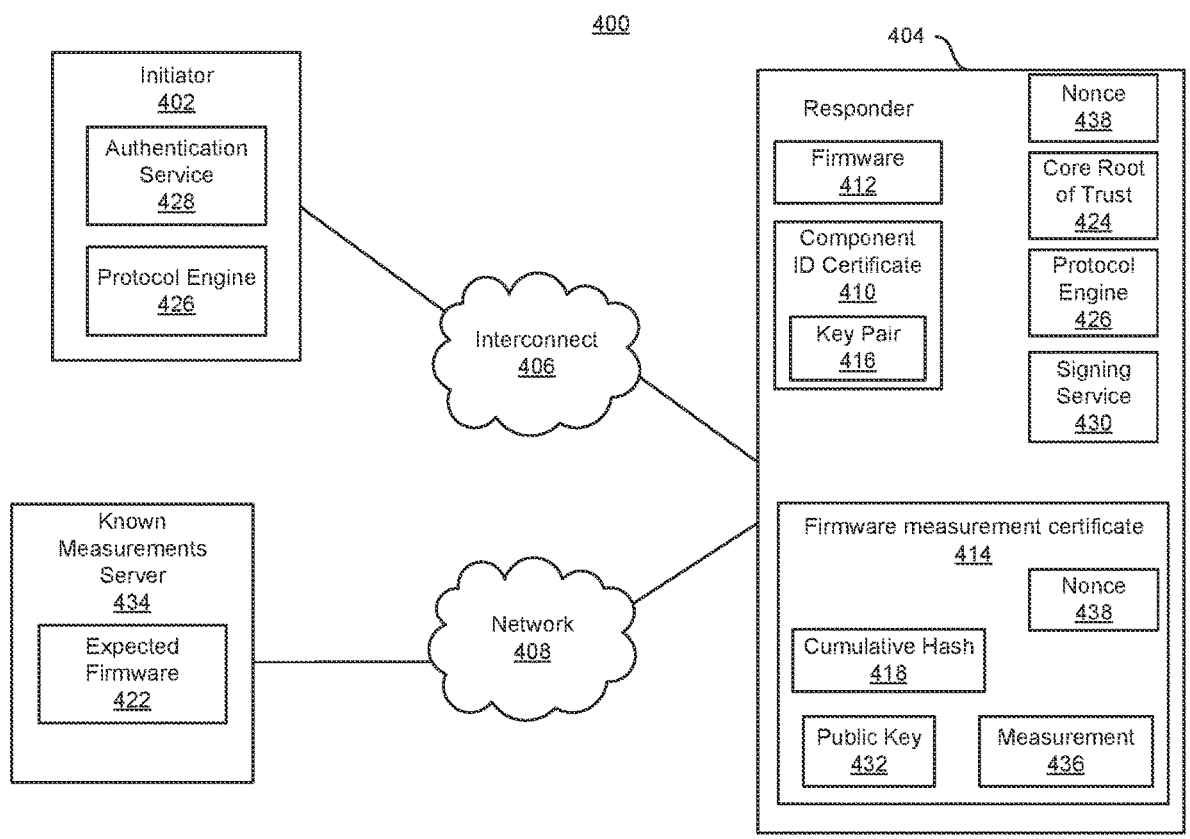
FIG. 4 is an example system for securing node groups.

As stated previously, the firmware measurement certificate 300 may be generated by a non-updateable, trusted piece of hardware or firmware code, such as the core root of trust, which is run at the first stage of initializing the component 214. The core root of trust may measure the next layer or layers of firmware 216 by taking their cryptographic hash. Each measurement may contribute to the cumulative hash 308 and be included in the measurements 310. In examples, the alias ID 312 may be generated by the core root of trust to authenticate the firmware measurement certificate 300. More specifically, the alias ID 312 may be generated based on the cumulative hash 308 or the measurements 310. The alias ID 312 may be used to sign the next layer. Accordingly, the alias ID 312 may be made available to the next layer of firmware 216 within the responder once initialization is complete and used to digitally sign the firmware measurement certificate 300 for the subsequent next layer of the firmware 216. For example, an alias ID, ID1, may be made available to layer L1. The layer, L1, may measure layer L2, which may generate alias ID, ID2, and issue a firmware measurement certificate 300 that is signed using the alias ID, ID1. This signature certifies the measurement of layer L2's cumulative hash 308 and measurements 310, and alias ID2. The alias ID, ID2, may then be made available to layer L2, FIG. 4 is an example system 400 for securing node groups. The system 400 includes multiple components, an initiator 402, in communication with a responder 404, over one or more interconnects 406, and/or a network 408. In examples, a controller, such as, the controller 212, may initiate an authentication process for a component, such as the component 214. Accordingly, the controller 212 may represent the initiator 402, and the authenticated component 214 may represent the responder 404. For example, the initiator 402 may be a general-purpose computer processor that performs in-band authentication of components 214 in a compute node 210 without a BMC. Alternatively, the initiator 402 may be a BMC, which performs out-of-band authentication of a general-purpose computer processor or other components 214 in a compute node with controllers 218, such as a processor and a BMC. While the authentication performed in examples of the present disclosure may be performed against a variety of components 214, for the sake of simplicity, authentication is described in the context of the authentication of a responder 404 that is a network interface controller (NIC). Accordingly, a BMC initiator and NIC responder may be connected to, and communicate over, a PCIe interconnect. Additionally, the NIC responder may be connected to a network 408. The BMC initiator may be authenticating all the components 214 in the compute node 210 or performing an authentication on the NIC specifically in response to a call from the node group manager 204. To determine whether the responder 404 is trustworthy, the initiator 402 may use an authentication service 428. In examples, the authentication service 428 may be a computer application that uses digital certificates under a public key infrastructure (PKI) to determine the trustworthiness of the responder 404. The responder 404 may not be trustworthy if a hacker or other malicious user has control. A malicious user may have control of the responder 404 if the responder 404 is a counterfeit hardware component, or if the firmware 216 on the responder 404 is counterfeit.

The initiator 402 and responder 404 may reside on the same compute nodes and thus communicate over one interconnect 406, which passes messages between the initiator 402 and responder 404 based on a specific protocol. The interconnect 406 may include one or more interconnects, such as a USB, PCIe, Gen-Z, and the like. The initiator 402 and responder 404 may include protocol engines 426 that may ensure the messages between the initiator 402 and responder 404 are provided in a format that accords with the protocols of the relevant interconnects 406. In some implementations, the initiator 402 may use multiple protocol engines 426 to handle interconnections with different kinds of components, such as, a baseboard management controller (BMC) and a general-purpose computer processor. The initiator 402 and responder 404 may also reside on different compute nodes 210. In such a case, network components on the compute nodes may provide connection to the network 408, which may include an internet protocol network, such as a local area network, wide area network, and the Internet.

To determine whether the responder 404 is trustworthy, the initiator 402 may authenticate the responder 404 by validating the public-private key pair 416 of the responder's component identification (ID) certificate 410 to determine the hardware of the responder 404 is authentic, i.e., not a counterfeit. The component ID certificate 410 may be a public key certificate that attests to the identity of the manufacturer of the responder 404. Attesting to the identity of the responder's manufacturer may ensure that the hardware of the responder 404 is trustworthy. The component ID certificate 410 may be read by any entity wishing to authenticate the responder 404, such as the initiator 402. In examples, the initiator 402 may authenticate the responder 404 by identifying the public key of the public-private key pair 416 and determining if the responder 404 is in possession of the private key corresponding to the public key. If the responder 404 is in possession of the private key, the initiator 402 may determine that the responders' hardware is trustworthy. The public key may be identified by verifying that the component ID certificate 410, or a chain of certificates, is signed by a trusted party. Once the public key may be trusted, the initiator 402 may challenge the responder 404 to prove possession of the corresponding private key. The challenge may involve having the responder 404 sign a nonce 438 with the private key. The nonce 438 may be a relatively large random number, e.g., 256 bits that is used only once. The initiator 402 may also apply an algorithm to the nonce 438 using the public key and use the resultant value to determine if the nonce 438 signed by the responder 404 is signed with the corresponding private key. If so, the initiator 402 may determine that the responders hardware is trustworthy.

Additionally, the responder 404 includes firmware 216, which may be a computer application that performs the operations of the responder 404. For example, the NIC responder may operate a physical network, such as an Ethernet, wireless, or radio network. The NIC responder may also send and receive data packets from one compute node 210 to another. Another example responder 404 may be a disk controller. The disk controller responder 404 may read data from, and write data to, a hard disk drive according to a storage device protocol, such as serial advanced technology attachment (SATA). The firmware 216 may include one or more layers, wherein each layer represents one computer application that executes in a specified sequence. Thus, operation of the responder is performed by executing the layers of the firmware 216 in this sequence. In examples, determining whether the responder 404 is trustworthy may also involve determining whether the firmware 216 is trustworthy. In such examples, the initiator 402 may determine whether the firmware 216 is trustworthy by validating one or more firmware measurement certificates 414 for the firmware 216.

As stated previously, the firmware measurement certificates 414 may be attribute certificates, which are digital documents that describe attributes that an issuer associates with the holder. In examples, the attributes described by the firmware measurement certificates 414 may be measurements of the binary image of the firmware 216 that is loaded into memory for execution. Attribute certificates may be associated with public key certificates, such as the component ID certificate 410. In this way, the firmware measurement certificates 414 may extend the certificate chain used for authentication of the responder 404. Thus, while the component ID certificate 410 may describe the identity of the manufacturer of the responder 404, the firmware measurement certificates 414 may describe properties of the firmware 216 being used to operate the responder 404. Similar to the component ID certificate 410, the firmware measurement certificates 414 may include a public key 432. The public key 432 may be part of a public-private key pair of mathematically-related keys for use in an asymmetric encryption scheme. In examples, the public-private keys pairs for each firmware measurement certificate 414 may be derived using an algorithm whose output depends on properties of the firmware or hardware logic that generates the certificate 414, such that a change in properties will produce a different pair of public-private keys. Additionally, firmware measurement certificates 414 may include a cumulative hash 418, which may represent a measure of the firmware 216 when loaded into the computer memory (not shown) for execution. In examples, the cumulative hash 418 may be compared to binary image of expected firmware 422 stored on a known measurements server 434. In examples, the initiator 402 may cache measurements from the known measurements server 434 for comparison to the firmware measurement certificates 414. The expected firmware 422 may be a binary image of the firmware that is installed on the responder 404 during manufacture, or during a legitimate update from the manufacturer. Thus, if the cumulative hash 418 does not match a cumulative hash of the expected firmware 422, the firmware 216 may not be trustworthy. Accordingly, the initiator 402 may decline to use the responder 404. In examples, the firmware measurement certificates 414 may be issued by the component being verified, i.e., responder 404, during the process of initialization (power-up) and possibly at other times. Accordingly, the firmware measurement certificates 414 may reside in, and be retrieved from, the responder 404. Alternatively, the firmware measurement certificates 414 may be temporarily stored in memory for caching after being retrieved from the responder 404. Because the firmware measurement certificates 414 are signed, they can be cached safely. Any tampering would invalidate the signature and therefore the firmware measurement certificate 414.

Each layer of the firmware 216 may be associated with one of the firmware measurement certificates 414. In some examples, each firmware measurement certificate 414 may include a unique public key 432. In such examples, a chain of firmware measurement certificates 414 may be created between the different layers of the firmware 216. In other words, a layer n, of the firmware 216 may certify the public key of the next layer, layer n+1. In turn, the layer n+1 uses the private key associated with the certified public key to sign the firmware measurement certificate 414 of layer n+2. In other examples, a single private-public key pair may be used for all layers of the firmware 216 on the responder 404. In such examples, the different layers of firmware 216 may be chained together by updating a cumulative hash 418 of the firmware measurement certificate 414 for each layer of the firmware 216. Accordingly, to verify the link between two layers of the firmware 216, the initiator 402 may compare the cumulative hash 418 of each layer's firmware measurement certificate 414.

In order to ensure their trustworthiness, the firmware measurement certificates 414 may be generated by a core root of trust 424. The core root of trust 424 may include non-updateable hardware or firmware installed by the original manufacturer of the responder 404, which can be trusted to create the firmware measurement certificate 414 that represents the actual measured binary image of the firmware 216. In examples, the firmware 216 may include multiple layers. Each layer may represent one portion of the computer instructions used to operate the responder 404. The layers may be executed in a prescribed sequence. Because the firmware 216 may include multiple layers, each layer may be susceptible to being compromised by a malicious user. Hence, the firmware measurement certificate 414 may be generated for each layer. To ensure the trustworthiness of the firmware measurement certificate 414 that is generated, the firmware measurement certificates 414 for each layer may be generated by an authenticated preceding layer. In an example responder 404 having multiple layers of firmware 216, the core root of trust 424 may generate a first firmware measurement certificate 414 representing the first layer of the firmware 216. Subsequently, prior to executing the second layer of firmware 216, the first layer may generate the firmware measurement certificate 414 for the second layer, thus ensuring the cumulative hash 418 for the second layer accurately represents the measured binary image of the second layer. Alternatively, the core root of trust 424 may generate a single firmware measurement certificate 414 that may be used to authenticate all the layers of the firmware 216.

Alternatively, a single firmware measurement certificate 414 may be used to authenticate multiple layers of firmware 414. Accordingly, a single firmware measurement certificate 414 may include measurements 436. The measurements 436 may represent a hash of the binary image for each layer of the firmware 216. Thus, there may be one measurement 436 for each layer of the firmware 216 up to the layer of the firmware 216 represented by the firmware measurement certificate 414. For example, if the firmware 216 includes layers, L0, L1, and L2, the measurements 436 for the firmware measurement certificate 414 may include three hashes: one hash for each of the binaries for layers, L0, L1, and L2.

Additionally, the firmware measurement certificate 414 may include a nonce 438. The nonce 438 may ensure the freshness of the measurements 436 and ensure that the core root of trust 424 is executed. The nonce 438 may be provided to the responder 404 by the initiator 402 during a challenge response protocol for authentication. Alternatively, the initiator 402 may write the nonce 438 to a specific memory location or register in the responder 404. Since the firmware measurement certificates 414 are generated at power-up or following a reset, the nonce 438 may be stored in a persistent location, such as in the responder 404. It is noted that for the first authentication of the responder 404, there may not be a nonce 438 available for the firmware measurement certificate 414. However, after the first authentication, the initiator 402 may provide the nonce 438, which may be written to persistent storage in the responder 404.

The responder 404 may include a signing service 430 and a protocol engine 426. The signing service 430 may provide a secure store. Examples of signing services include a trusted platform module and a field-programmable gate array. A trusted platform module may be a security co-processor that operates in response to a prescribed set of commands that may be used to securely store data, including the operating state of a computing platform, such as the compute node. A field-programmable gate array (FPGA) may be an integrated circuit that can be programmed using a hardware description language to perform specific instructions. In this way, an FPGA is similar to the processor. In contrast however, the processor may additionally be pre-programmed with a complex instruction set.

Figure 5:
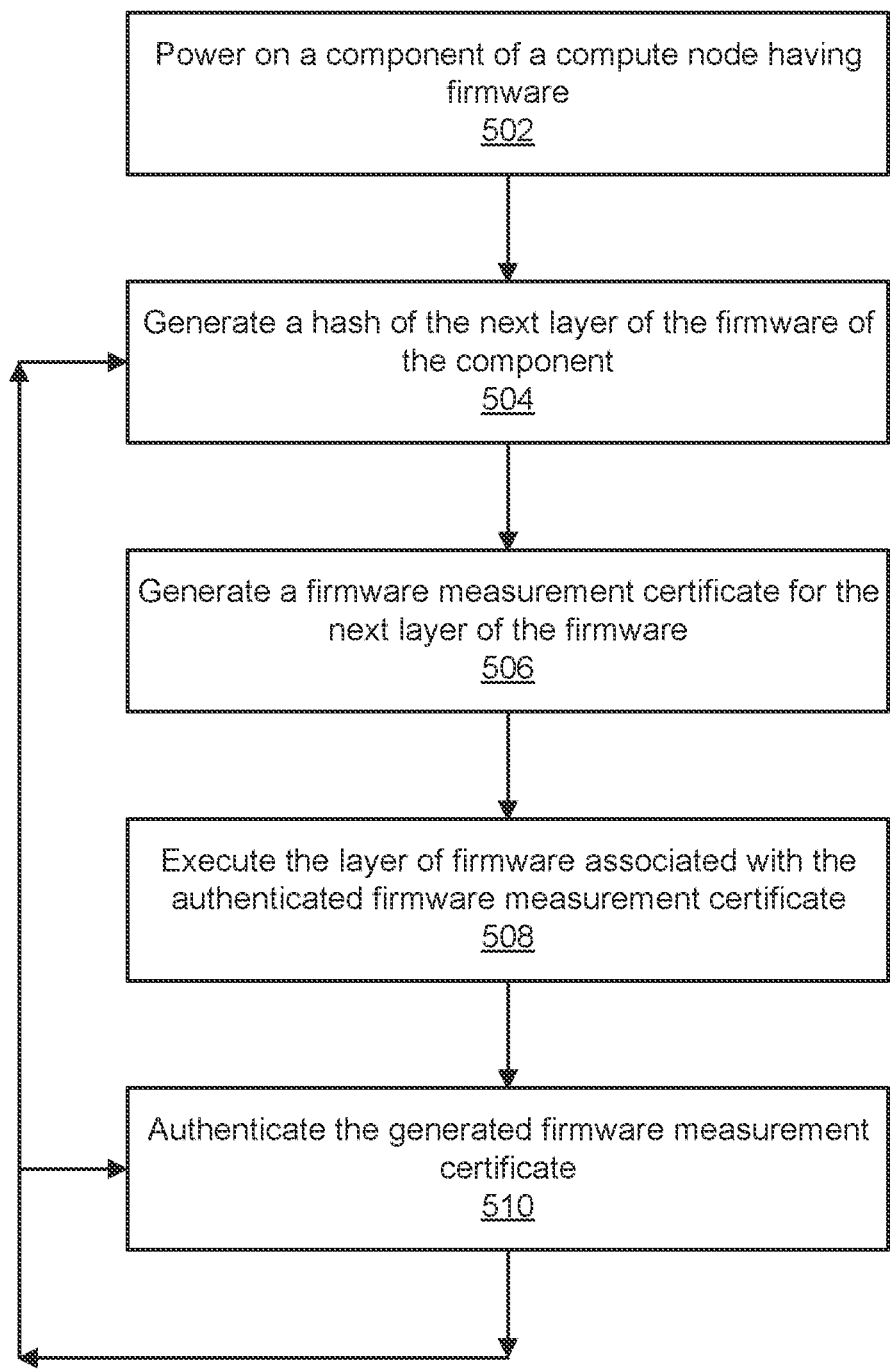
FIG. 5 is a process flow diagram of a method for generating firmware measurement certificates to secure node groups.

FIG. 5 is a process flow diagram of a method 500 for generating firmware measurement certificates to secure node groups. At block 502, a component of a compute node having firmware may power on or commence re-initialization. The component may be a responder, such as the responder 404. An example responder 404 may include any of the components of the compute node 100, such as the processor 108, Gen-Z components 110, and so on. For the purpose of this discussion, one of the PCIe components 130 of the compute node 100 is used as an example component. The PCIe component 130 may power on during a power-cycle of the compute node 100. Alternatively, the PCIe component 130 may power on when the compute node 100 exits a low-power or reset state. A nonce, such as the nonce 438 may also be read from persistent storage. In examples, the nonce 438 may be provided by the initiator 402. For example, the nonce 438 may be provided from a previous authentication request, e.g., authentication request 314. In such an example, the responder 404 may store the nonce 438 in persistent storage within the responder 404. In another example, the initiator 402 may write a nonce 438 into a register in the responder 404. For example, PCIe devices, such as the PCIe component 130 may expose registers which can be read and written over a PCIe bus. The value stored in such a register may persist the nonce 438 across resets or power cycles Additionally, the first layer, L0, of the firmware 412 of the PCIe component 130 may be loaded into memory. As stated previously, the PCIe component 130 may be an example of the responder 404 described with respect to FIG. 4. The PCIe component 130 may be powered on at block 502 by an operating system of the compute node 100. The method 500 may be further performed by a core root of trust of the PCIe component 130, such as the core root of trust 424.

At block 504, a hash may be generated for the next layer of the firmware 412 of the PCIe component 130. For example, after powering on, the layer L0, which may represent the immutable core root of trust 424, may measure layer L1 of the firmware 412. The hash may be a NIST approved hash of the binary image of layer L1.

At block 506, a firmware measurement certificate, such as the firmware measurement certificate 300, may be generated for the next layer of the firmware 412. For example, the core root of trust 424 may generate the firmware measurement certificate 300 for layer L1. The firmware measurement certificate 300 may include an issuer 302, a component ID 306, an alias ID 312, and either a cumulative hash 308 or a measurement 310. The issuer 302 and the component ID 306 may be the component ID of the PCIe component 130. The component ID of the PCIe component 130 may be considered layer L0, which may be considered to be issuing the firmware measurement certificate 300. The alias ID 312 may be a public key that identifies the owner of the firmware measurement certificate 300. The owner of the firmware measurement certificate 300 may be the next layer, layer L1 after power on. The cumulative hash 308 or measurement 310 may be populated based on the hash generated at block 504. The cumulative hash 308 may be determined based on Equation 1. Additionally, the measurement 310 may be populated with the generated hash. Additionally, the keyCertSign bit for the firmware measurement certificate 300 may be cleared to prevent malicious users from creating counterfeit certification authorities.

In examples, the firmware 412 may include one or more layers. As such, blocks 504-506 may be repeated for each subsequent layer of the firmware 412. However, instead of being performed by the core root of trust 424, the blocks 504-506 may be performed by the current layer of the firmware 412. Thus, layer L0 may generate the firmware measurement certificate 300 for layer L1 Layer L1 may generate the firmware measurement certificate for layer L2, and so on. If the firmware 412 includes one layer, the method 500 may flow to block 508.

At block 508, the layer of the firmware 412 associated with the generated firmware measurement certificate 300 may be executed. Executing the firmware 412 may involve operating the PCIe component 130.

At block 510, an initiator, such as the initiator 402, may authenticate the firmware measurement certificate 300 generated at block 506. The authentication may be performed as described with respect to FIG. 3. If the authentication fails, the method 500 may end. If the firmware measurement certificate 300 is authenticated however, the method 500 execution of the firmware 412 may continue. Further, in some scenarios, the same firmware measurement certificate 300 may be authenticated multiple times. Multiple authentications may be performed if the compute node 100 has not been power cycled, but authentication of the firmware 412 is requested. Additionally, the nonce provided by the initiator 402 during authentication may be written to the PCIe component 130.

In examples, additional firmware measurement certificates 300 may be added after execution of the firmware 412. If the operating system loads additional firmware 412 into the PCIe component 130 shortly after the OS has started, additional firmware measurement certificates 300 may be generated. Additional firmware measurement certificates 300 might also be generated if the operating system updates the firmware 412. As such, the method may flow to block 504. In the case of a single firmware measurement certificate 300 for all layers of the firmware 412, the firmware measurement certificate 300 may be updated instead of adding new firmware measurement certificates 300.

In some examples, multiple firmware certificates 300 may be generated in blocks 504-510, one for each layer of the firmware 412. In such examples, the component ID 306 for each firmware measurement certificate 300 may be the component ID of the PCIe component 130. The issuer 302 for such firmware measurement certificates 300 may be the preceding layer of the firmware 412. The alias ID 312 may be a public key that identifies the current layer of the firmware 412. The nonce 438 may be the nonce stored in the PCIe component 130 by the initiator 402. In examples with multiple firmware measurement certificates 300 for one component, such as the PCIe component 130, the cumulative hash 308 may be populated. The cumulative hash 308, as described with respect to Equation 1, may be a concatenation of the previous layer's cumulative hash and an NIST-approved hash function of the binary image of the current layer. The NIST-approved hash function of the binary image of the current layer may additionally be appended to the measurements 310.

In some examples, a single firmware measurement certificate 300 may be generated that represents all the layers of the firmware 412. In such examples, instead of generating new firmware measurement certificates 300 for each layer, a new firmware measurement certificate 300 may be issued with an updated signature. This new firmware measurement certificate 300 may replace the previously issued firmware measurement certificate 300. This new firmware measurement certificate 300 may be generated by the current layer of the firmware 412. In the new firmware measurement certificate 300, the component ID 306 and nonce 314 may not be changed. However, the issuer 302 may be the current layer of firmware 412. The alias ID 312 may be a public key that identifies the next layer of the firmware 412. In examples with a single firmware measurement certificate 300 for the PCIe component 130, the cumulative hash 308 and the measurements 310 may be populated. The cumulative hash 308, as described with respect to Equation 1, may be a concatenation of the previous layer's cumulative hash and an NIST-approved hash function of the binary image of the current layer. Accordingly, the measurements 310 from the previously issued firmware measurement certificate 300 may be supplemented with a new measurement 310 for the next layer of the firmware 412. The measurement 310 may be an NIST-approved hash function of the binary image of the next layer of firmware 412.

It is to be understood that the process flow diagram of FIG. 5 is not intended to indicate that the method 500 is to include all of the blocks shown in FIG. 5 in every case. Further, any number of additional blocks can be included within the method 500, depending on the details of the specific implementation. In addition, it is to be understood that the process flow diagram of FIG. 5 is not intended to indicate that the method 500 is only to proceed in the order indicated by the blocks shown in FIG. 5 in every case. For example, block 504 can be rearranged to occur before block 502.

Figure 6:
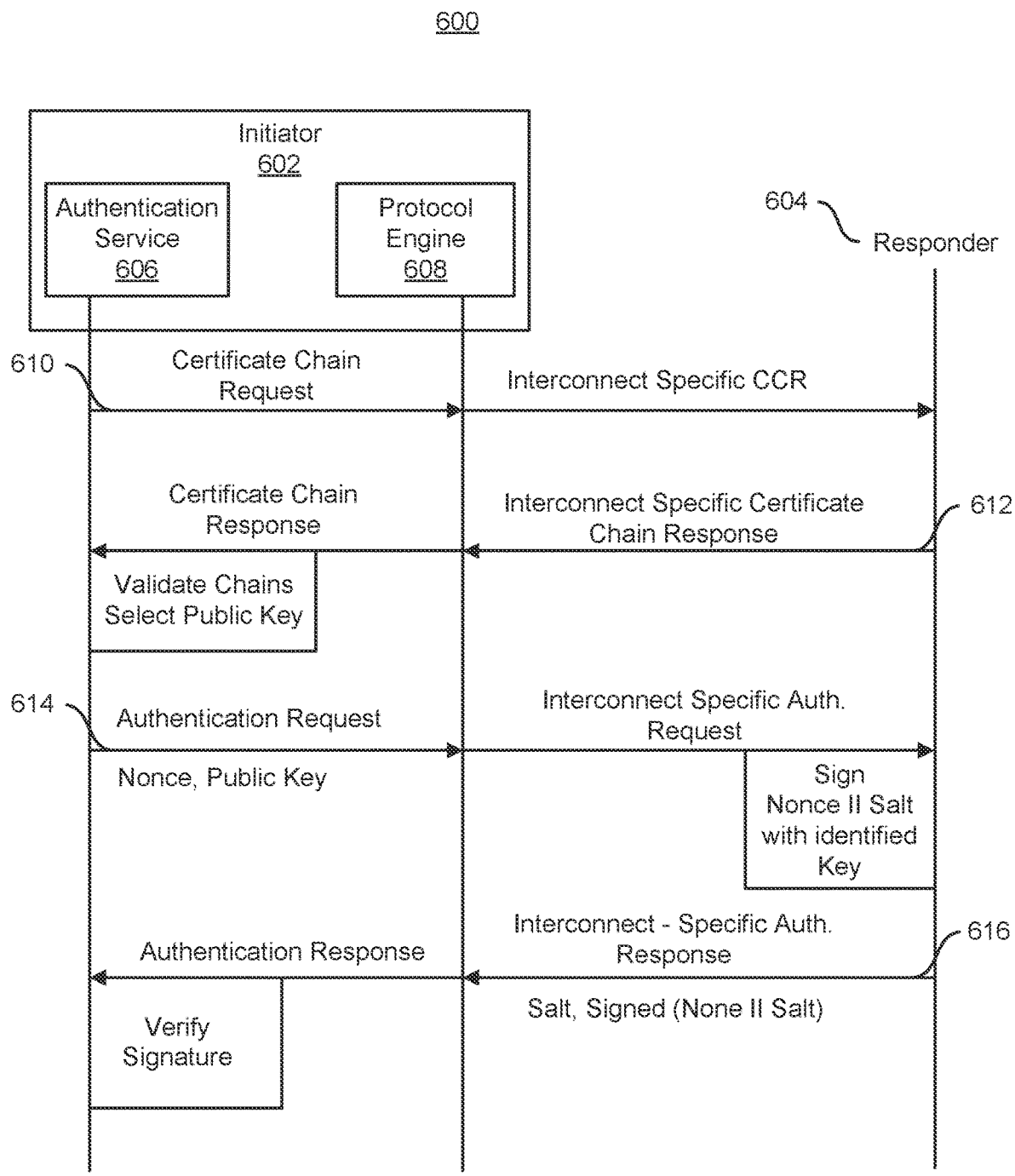
FIG. 6 is a message flow diagram for authenticating components in a system for securing node groups.

FIG. 6 is a message flow diagram 600 for authenticating components in a system for securing node groups. The message flow diagram 600 may represent a flow of messages between an authentication initiator 602 and a responder 604. The initiator 602 may represent a component, such as the initiator 402, and may include an authentication service 606 and a protocol engine 608. The protocol engine 608 may translate the messages between the initiator 602 and the responder 604 based on the interconnects between the initiator 602 and responder 604. The responder 604 may represent a component having firmware, such as the responder 404. Message 610 represents a request from the initiator 602 for the responder's certificate chain (or chains.) The message 612 represents the certificate chain sent by the responder 604 to the initiator 602 in response to the request. In response to receiving the responder's certificate chain, the initiator 602 may validate one or more of the certificate chains and select the public key to be authenticated by the responder 604. The public key may be selected from the leaf certificate of a valid certificate chain.

Message 614 may represent an authentication request from the initiator 602 to the responder 604. The authentication request may consist of a large random nonce, and the selected public key to be authenticated. In the general case, the public key to be authenticated is identified because the responder 604 may have multiple public-private key pairs used for different purposes.

Once the authentication request is received, the responder's protocol engine may extract the nonce and identity of the public key to be authenticated from the authentication request. Additionally, the responder's signing service may sign a concatenation of the nonce and an internally generated random salt with the private key that corresponds to the identified public key. The purpose of the salt is to protect against chosen plain-text attacks, so it should be unpredictable to the initiator. Message 616 may represent the responder's response to the authentication request containing the salt and the signature over the concatenation of the nonce and salt.

Once the response to the authentication request is received, the initiator 602 may verify that the nonce and salt have been signed by the private key corresponding to the public key in the leaf certificate. If verification is successful, the responder 604 has been authenticated.

Figure 7:
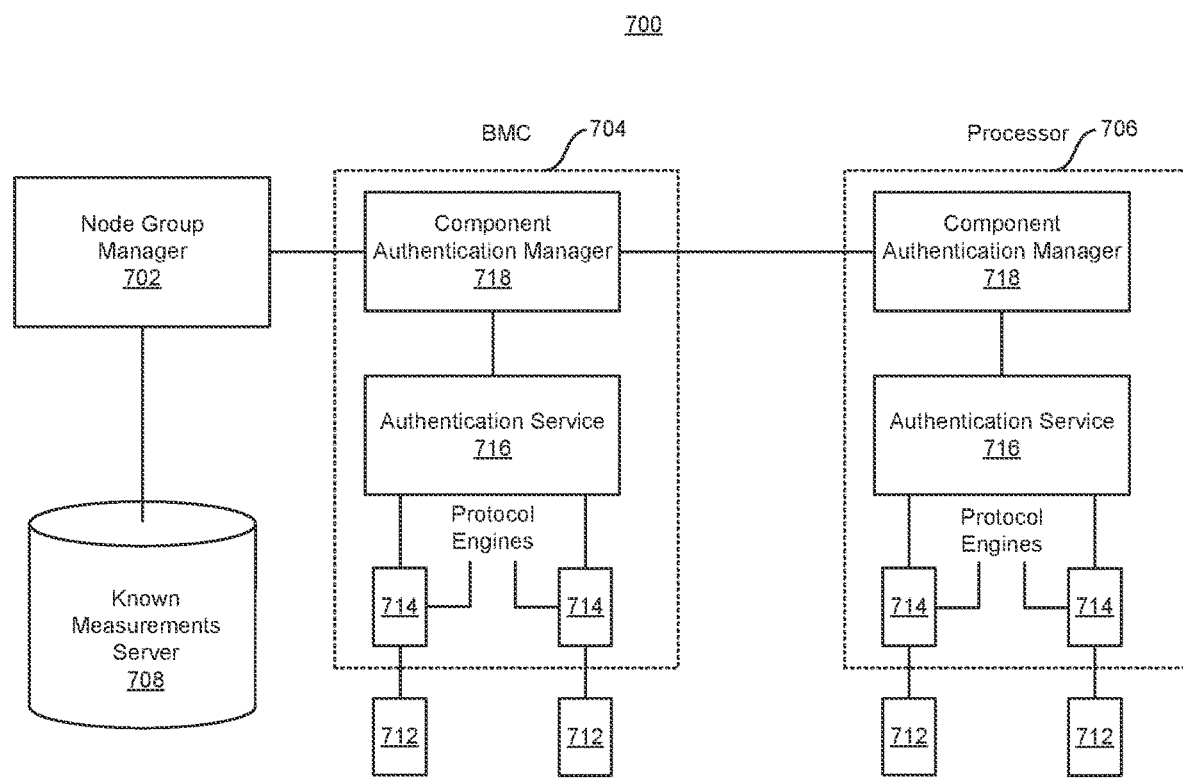
FIG. 7 is an example system for securing node groups.

FIG. 7 is an example system 700 for securing node groups. The example system 700 includes a node group manager 702, a baseboard management controller (BMC) 704, a processor 706, and a known measurements server 708. The BMC 704 and processor 706 may represent specific examples of the controller 212 described with respect to FIG. 2. Additionally, the BMC 704 and processor 706 may be implemented on one or more nodes 210 within a node group (not shown). Similar to the system 200, the example node group manager 702 may secure one or more node groups by authenticating each of the nodes 210. Authenticating each of the nodes 210 may include authenticating the trustworthiness of the hardware and firmware of the BMC 704, processor 706, and components 712 that are installed. In examples, the components 712 may be connected to either or both of the BMC 704 and processor 706 over one or more interconnects, including, PCIe, USB, I2C, and the like. Additionally, the node group manager 702 may be used to report the inventory status of each of the nodes over an IP network. The inventory status may represent various details about the authentication of an inventory of components 712 for the node 210. The inventory status may include an identifier of the BMC 704, processor 706, or component 712 being authenticated, the timing of the authentication(s), the interconnect(s) over which the authentication is performed, and the like. Being able to determine the inventory status of the components 712 may make it possible to detect and monitor activity of service engineers, for example. In this way, it may be possible to reduce the likelihood of mistakes or malicious insertion during service activity. Service activity refers to the acts of installing new components 712 or updating firmware.

The BMC 704 and processor 706 may include protocol engines 714, an authentication service 716, and a component authentication manager 718. The authentication service 714 and protocol engines 716 may represent examples of the authentication service 606 and protocol engine 608 described with respect to FIG. 6. Referring back to FIG. 7, the component authentication manager 718 may use the authentication service 714 and protocol engines 716 to perform the authentications during initialization and at the request of the node group manager 702.

During initialization, the component authentication manager 718 may direct the authentication service 714 to authenticate every component 712 that is reachable on each interconnect or fabric that connects to the respective BMC 704 and processor 706. Some components 712 may be accessible by more than one interconnect. For example, a component 712 may be accessible to the BMC 704 over both PCIe and I2C. In such an example, a point-to-point 120 connection may be used to distribute confidential material, e.g. encryption or authentication keys. The I2C connection may be used in this way instead of a shared PCIe fabric. The shared PCIe fabric may have relatively higher bandwidth than the I2C interconnect and may be used for data transfers. However, the PCIe fabric may be more susceptible to snooping than I2C. Thus, by authenticating the component 712 through both its PCIe and its I2C connections, the BMC 704 may have assurance that the component 712 is securely connected. Keys distributed over the I2C connection may be used to encrypt and decrypt data that is stored within a compute node. Alternatively, encryption keys may be used for authenticated and encrypted data transfers for data that is stored in the compute node unencrypted.

By authenticating the components 712 over the available interconnects and fabrics, the component authentication manager 718 may generate an authenticated inventory of all active components 712 to which the respective BMC 704 or processor 706 is connected. More specifically, the component authentication manager 718 may include a data store having a list of authenticated components, together with their certificate chains and the status of whether each certificate chain has been authenticated or not. Generating and maintaining this authenticated inventory over time may provide a record of inventory tracking that can be validated against the known measurements server 708 to ensure the trustworthiness of the components 712 and associated firmware. The component authentication manager 718 may also able to build and maintain a connection topology for the components 712. Additionally, the BMC 704 may be connected over an interconnect or fabric with the processor 706. As such, the BMC 704 and processor 706 may authenticate each other.

In examples, the BMC 704 may serve as the local authority for all communication with the node group manager 702. Although FIG. 7 shows a single BMC 704 connected to the node group manager 702, in examples, the node group manager 702 may maintain connections to several BMCs. Similarly, although the system 700 only includes one node group manager 702, in examples, a hierarchy, federation, or other set of cluster authentication and verification managers may be present. The component authentication manager 718 in the BMC 704 may retrieve the authenticated inventory from the component authentication manager 718 in the processor 706. In examples, the authenticated inventory may be stored in an attribute certificate that contains a list of component identities that have been authenticated by the controller, along with a set of metadata, e.g., interconnect identifier, timestamp, etc. Such an attribute certificate may also list the authentication failures (e.g., identifiers for the components 712 that failed to authenticate, were unresponsive, or had unresponsive connections). The attribute certificate may be issued by the processor 706 once the processor 706 has been authenticated to the BMC 704. Since attribute certificates may be signed assertions, the attribute certificates may be stored, copied and transmitted over networks without danger that a malicious user may add or remove information about what components 712 have been authenticated.

Authentication failures may be detected through electrical connections with unresponsive components 712, missing authentications from components 712 that were previously authenticated, and changes to the connection topology for components 712. Accordingly, the component authentication manager 718 and node group manager 702 may store previous connection topologies, inventory reports, and authentication status for comparison.

The node group manager 702 may authenticate the BMC 704 by using the BMC's component authentication manager 718 to retrieve an attribute certificate including the authenticated inventory of components 712 authenticated by the BMC 704. In addition, the node group manager 702 may use the BMC's component authentication manager 718 to retrieve the authenticated inventory of the processor 706. In an example, the inventory of components for a node, such as the node 210, may be included in a single signed assertion or certificate. In such examples, the certificate or assertion may reference other certificates and assertions.

The node group manager 702 may also able to retrieve all certificate chains for all components 712 using the component authentication managers 718 and may be able to request that the component authentication managers 718 authenticate any certificate chain for any connected component 712 or controller. In the case of components connected to the processor 706, the BMC's component authentication manager 718 may forward the authentication request to the processor's component authentication manager 718.

In an example, the component authentication manager 718 may provide an application programming interface (API). In such an example, the API may include operations to list components, get certificate chains, query status, authenticate components and other related operations. The list components operation may return one or more attribute certificates. Each attribute certificate may list the authenticated components 712 associated with a particular component authentication manager 718, as well as relevant metadata such as interconnect identifiers and any authentication failures that may have been detected. In examples, component authentication managers 718 may be logically configured in a hierarchy. Accordingly, certain component authentication managers 718 may represent different levels of an architecture in a tree-like structure. As such, the component authentication managers 718 at the bottom of this tree-like structure may be referred to as leaves. In examples, the component authentication managers 718 for leaves in the hierarchy may return a single attribute certificate. For component managers 718 higher in the hierarchy, multiple attribute certificates will be returned. In examples, variations of the list component operation may also be included. Such variations may provide information about the topology of the component 712, and authentication information, such as a timestamp of the authentication.

The get certificate chains operation may provide the certificate chains retrieved from a component 712. Accordingly, a call to the get certificate chains operation may specify the component 712 for which the certificate chains are to be retrieved.

The query status operation may provide the authentication status of the specified component 712. If the component 712 has been authenticated, the query status operation may provide the public-private key pair 416 that has been authenticated. Additionally, for each public-private key pair 416, the query status operation may provide the number of times that the public-private key pair 416 has been authenticated since the component 712 was last initialized and a timestamp of the last authentication. Further, for authenticated components 712, the identity of the authentication initiator may be provided. For components 712 that have failed authentication, an error code may be provided.

The authenticate operation may specify an identifier for the component 712 being authenticated, a public key of the public-private key pair 416 for the component 712, and a nonce. Accordingly, the component authentication manager 718 may use the given nonce to authenticate the identified component 712 that is in possession of the given public key. However, in some cases, the authenticate operation may be denied if it is not possible to authenticate the component 712. For example, it might not be possible for the component authentication manager 718 of the processor 706 to authenticate a DDR component if the processor 706 is running a workload, such as applications or the operating system. Rather, such authentication may be limited to times when the processor 706 is in a particular mode of operation, or running specific firmware: for example, during a power-on-self-test.

Using firmware measurement certificates 218 to denote authenticated inventory may prevent tampering because the inventory can be compared over time. For example, each time a node is rebooted, the component authentication manager 718 may compare the authenticated inventory to the actual inventory. Once the node group manager 702 accesses the firmware measurement certificates 218 of authenticated components 712 and the certificate chains corresponding to the authenticated components 712, the component authentication manager 718 may verify the correctness of any firmware measurements contained in authenticated certificate chains. The component authentication manager 718 may verify the correctness by comparing the measurements or cumulative hashes to values contained in the known measurements server 708.

How the authentication of components 712 is done may vary depending on whether the system 700 is undergoing initialization or running a workload. After a reset or power-cycle, as part of the initialization process, the component authentication manager 718 may authenticate all components 712 on any bus or fabric connected to the BMC 704 described above. The results of the authentication may be saved in the form of an attribute certificate in the authentication database 206. Additionally, the BMC 704 may boot the processor 706 with firmware or a reduced-function operating system so that the processor 706 can authenticate all components 712 on any bus or fabric connected to the processor 706, such as the DDR, Gen-Z, PCIe and USB connections. Additionally, the BMC 704 may authenticate the processor 706 using the authentication pattern described with respect to FIG. 6. In examples, the system 700 may include a security co-processor (not shown), such as a trusted platform module (TPM). In such examples, the processor 706 may authenticate the keys and certificates that have been issued to the TPM during manufacturing. The TPM may be attached to the same board as the processor 706. Alternatively, the TPM may be integrated within the processor package. In examples, the BMC 704 may retrieve an attribute certificate (not shown) from the processor's component authentication manager 718 that lists the authenticated inventory of components 712 connected to the processor 706. This attribute certificate may be made available to the node group manager 702 where it may be archived for future comparison and inventory tracking. In this way, all components 712 within the system 700 may be authenticated during power-cycle and initialization.

However, the system 700 may not be power-cycled or re-initialized for months or years. Hence, during runtime, the BMC 704 may run the component authentication manager 718 to authenticate all connected components 712. Additionally, the BMC 704 may authenticate any new component 712 that is the subject of a hot-plug or hot-insertion event, such as a USB device. In examples, the operating system and device drivers may be enhanced to support component authentication of the processor 706 and the connected components. In such examples, the operating system may run an authentication service and also the component authentication manager 718 to report the authentication status of any components 712 that are authenticated. The operating system may maintain presence, insertion and removal information for all connected components 712. Further, the operating system may authenticate components 712 in response to insertion events and periodically during runtime. The operating system may also authenticate the processor 706 and connected components 712 when an exit from a low power state occurs.

Alternatively, a security processor distinct from the processor 706 and a Trusted Execution Environment (TEE) may be used to run the component authentication manager 718 and authentication service. In another example, a reduced-function hypervisor may be used to wall-off component authentication and other security critical functionality from the main operating system. In another example, a system management interrupt (SMI) may be used to run the component authentication manager 718 and authentication service on the processor 706. In such an example, the BMC 704 may generate the SMI to trigger the execution of a handler that runs the component authentication manager 718 and authentication service. In this way, the BMC 704 may trigger an authentication of one or more components 712 connected to the processor 706. In some scenarios, the components 712 may be subject to deep low-power events. In such scenarios, runtime authentication may be used to detect any component replacement that occurs during such events.

Figure 8:
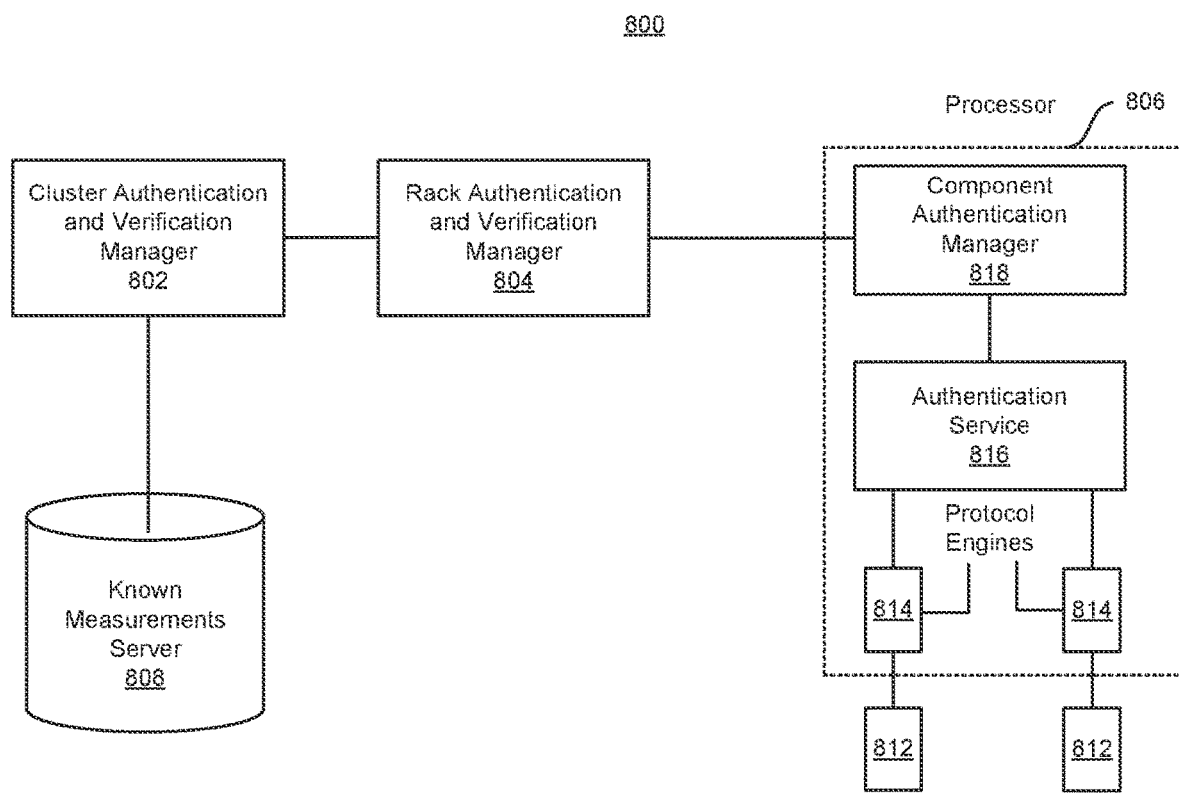
FIG. 8 is an example system for securing node groups.

FIG. 8 is an example system 800 for securing node groups. Other arrangements of the authentication are possible and may be more useful for different architectures. For example, system 800 includes a cluster authentication and verification manager 802, a rack authentication and verification manager 804, a processor 806, and known good measurements 808. The cluster authentication and verification manager 802 and rack authentication and verification manager 804 may be similar to the node group manager 702 described with respect to FIG. 7 but operating at different hierarchical levels to address manageability and scalability requirements. Referring back to FIG. 8, the processor 806 may include protocol engines 814, an authentication service 816, and a component authentication manager 818. The authentication service 814 and protocol engines 816 may represent examples of the authentication service 606 and protocol engine 608 described with respect to FIG. 6. Referring back to FIG. 8, the component authentication manager 818 may use the authentication service 814 and protocol engines 816 to perform the authentications during initialization and at the request of the cluster authentication and verification manager 802.

The system 800 may represent a node without a BMC where a single component authentication manager 818 runs on the processor 806 and is connected to the rack authentication and verification manager 804. The system 800 may perform 'in-band' authentication, which means the authentication may be taking place over the same interconnections used by the applications and services that are running on the processor 806. In examples, the rack authentication and verification manager 804 may be connected to multiple processors, e.g., all the processors in a rack. The rack authentication and verification manager 804 may perform the same functions as the cluster manager, such as, verifying the firmware, but only for those components 812 in the rack. In addition, the rack authentication and verification manager 804 may provide the same API to the cluster authentication and verification manager 802 that the component authentication manager 718 provides to the node group manager 702 as described with respect to FIG. 7. In this way, the cluster authentication and verification manager 802 may be able to get a cluster-wide view of the authenticated inventory and force re-authentication of any component 812 through the rack authentication and verification manager 804. In another example, the system 800 may include a dedicated network interface for the management plane, wherein access to the component authentication manager 818 may be restricted to the dedicated network interface.

In another example, some components 812 may not be associated with a node, rather such components 812 may be associated with a rack or another component, such as a power distribution unit, fan, or sensor. In such an example, the components 812 may be authenticated using the same mechanisms and principles described above. Accordingly, the component authentication manager 818 and authentication service 814 may be embedded in the rack authentication and verification manager 804 and use whatever protocol is used to control the rack power distribution unit, fan or sensor for authentication.

In examples, the known good measurements 808 may include manifests that described the expected measurements of the components 812. The manifests may be created by manufacturers of platforms, such as nodes 210. More specifically, during the last stages of manufacture of a node 210, e.g., during testing, the components 812 could be powered-up and initialized. Further, firmware measurement certificates may be generated for the components. Accordingly, the cluster authentication and verification manager 802 and the rack authentication and verification manager 804 may determine the component identities and firmware measurements of the components 812. The manufacturer or system integrator can then issue a set of "manifest" certificates specifying what components and firmware are in the node 210, i.e. what is the "known good state" of the overall system as it exits the factory. Thus, when the node 210 arrives at the customer site, the customer can compare the manifest to what is being reported by the cluster authentication and verification manager 802 or the rack authentication and verification manager 804 to ensure that the node 210 has not been tampered with en route from the factory. In one example, the manifests may be Platform Certificates, which are under development by the Trusted Computing Group.

With regard to authentication of node groups, a hierarchy of services may be used to manage component authentication and verification at cluster scale. Accordingly, Table 1 provides an example hierarchy listing the services and responsibilities of each node hierarchy level in the hierarchy. The lowest level in the hierarchy is a single node, whereas the highest level may be the cluster. The node may deliver compute, storage or networking (switch) services. The bulk of components may be contained within nodes. An enclosure may contain multiple nodes and may have one or more power supplies. A rack may have multiple enclosures and power supplies or UPS (Uninterruptible Power Supplies). A cluster may contain multiple racks.

TABLE 1

| Node Hierarchy Level | Services and responsibilities |
| --- | --- |
| Single Node | Component authentication manager and component authentication service<br>Services may run on iLO, BMC, Management Engine, and main processor<br>Authenticate all components on the node<br>Store authenticated firmware measurement certificates<br>Periodic re-authentication of components<br>Provide authenticated inventory in the form of attribute certificates to higher level entities<br>Respond to authentication requests from higher level entities<br>Authenticate self, authenticate specified component<br>Enforce authentication and verification policy |
| Enclosure | Component authentication manager, component authentication service, verification service<br>Services may run on designated management node<br>Authenticate all components in the enclosure<br>Directly for components not associated with a node<br>Via component authentication manager for components within a node<br>Request authenticated inventory from node component authentication managers<br>Compares firmware measurements to known good state<br>Recovery action initiated if measurements determine to be incorrect<br>Store authenticated certificates<br>Periodic re-authentication of components via component authentication managers<br>Provide authenticated inventory in the form of attribute certificates to higher level entities<br>Respond to authentication requests from higher level entities<br>Authenticate self, authenticate specified component via component authentication managers<br>Enforce authentication and verification policy |
| Rack | Component authentication manager, component authentication service, verification service<br>Services may run on designated management node<br>Authenticate all components in the rack<br>Directly for components not associated with an enclosure<br>Via component authentication manager for components within an enclosure<br>Request authenticated inventory from enclosure component authentication managers<br>Compares firmware measurements to known good state<br>Recovery action initiated if measurements determine to be incorrect<br>Store authenticated certificates<br>Periodic re-authentication of components<br>Provide authenticated inventory in the form of attribute certificates to higher level entities<br>Respond to authentication requests from higher level entities<br>Authenticate self, authenticate specified components via component authentication managers<br>Enforce authentication and verification policy |
| Cluster | This level of hierarchy may use multiple rack, enclosure and node, authentication and verification services to manage authentication and verification at cluster scale. Various architectures for high availability and resilience may be employed. |

Depending on the size and configuration of a computer hardware architecture, some elements of the hierarchy may be omitted. For example, if there are a small number of racks, the cluster services may interact directly with the enclosure authentication and verification services. It is noted that Table 1 is merely one possible hierarchy of nodes and node groups. In examples, other organizations of hierarchies may be used. For example, clusters may be included within the hierarchy level of a data center. Further, data centers may be included within a hierarchy level of an information technology department, or an enterprise, for example.

Figure 9:
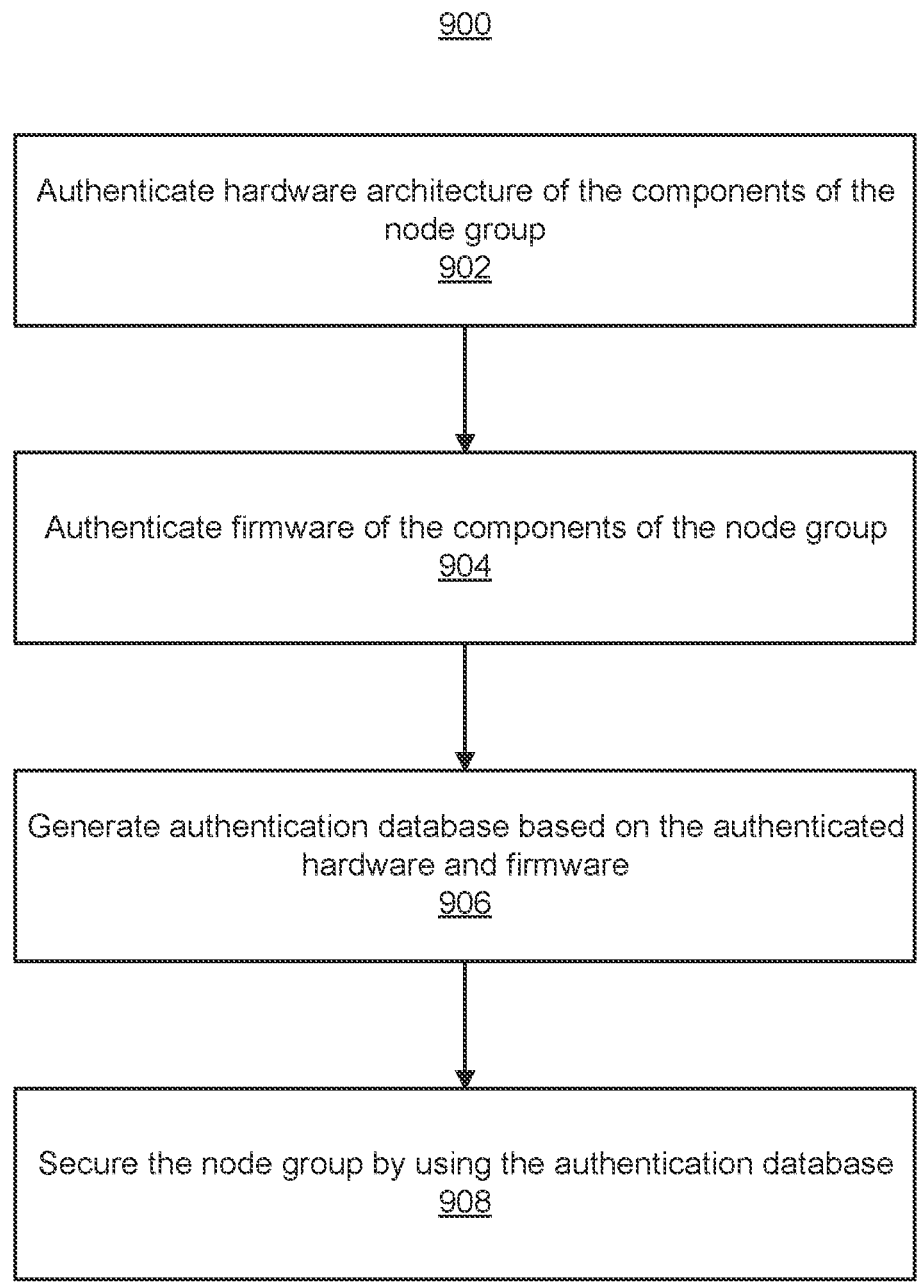
FIG. 9 is a process flow diagram of a method for securing node groups.

FIG. 9 is a process flow diagram of a method 900 for securing node groups. The method 900 may be performed by a node group manager, such as the node group manager 204. At block 902, the node group manager 904 may authenticate a hardware architecture of the components 214 of a node group 202. The node group 202 may be described as a node hierarchy level. The node hierarchy level may include one or more compute nodes 210. Authenticating the hardware architecture may include establishing that the hardware of the components 214 is from known and trusted manufacturers. Establishing that the hardware is from known and trusted manufacturers may include validating the certificate chain of the components 214.

At block 904, the node group manager 204 may authenticate the firmware 216 of each of the components 214 of the node group 202. Authenticating the firmware 216 may include comparing the measurements in the firmware measurement certificates 218 for the components 214 to the measurements in the known measurements server 208.

At block 906, the node group manager 204 may generate an authentication database 206 based on the authenticated hardware architecture and the authenticated firmware 216. The authentication database 206 may include descriptions of the authentications, such as when each component 214 is authenticated.

At block 908, the node group manager 204 may secure the node group 210 by using the authentication database 206. In examples, a policy for securing a specified node group 202 may be implemented by using the authentication database 206. For example, the authentication database 206 may describe when the components 214 of the node group 202 were last authenticated. Further, an example policy for securing the node group 202 may specify that the components 214 are to be authenticated at least once a month. As such, the node group manager 204 may execute a policy script every month that checks when the components 214 of the node group 202 were last authenticated. If any of the components 214 has not been authenticated within the last month, the node group manager 204 may automatically validate the components 214 that have not been validate in accord with the policy.

It is to be understood that the process flow diagram of FIG. 9 is not intended to indicate that the method 900 is to include all of the blocks shown in FIG. 9 in every case. Further, any number of additional blocks can be included within the method 900, depending on the details of the specific implementation. In addition, it is to be understood that the process flow diagram of FIG. 9 is not intended to indicate that the method 900 is only to proceed in the order indicated by the blocks shown in FIG. 9 in every case. For example, block 904 can be rearranged to occur before block 902.

Figure 10:
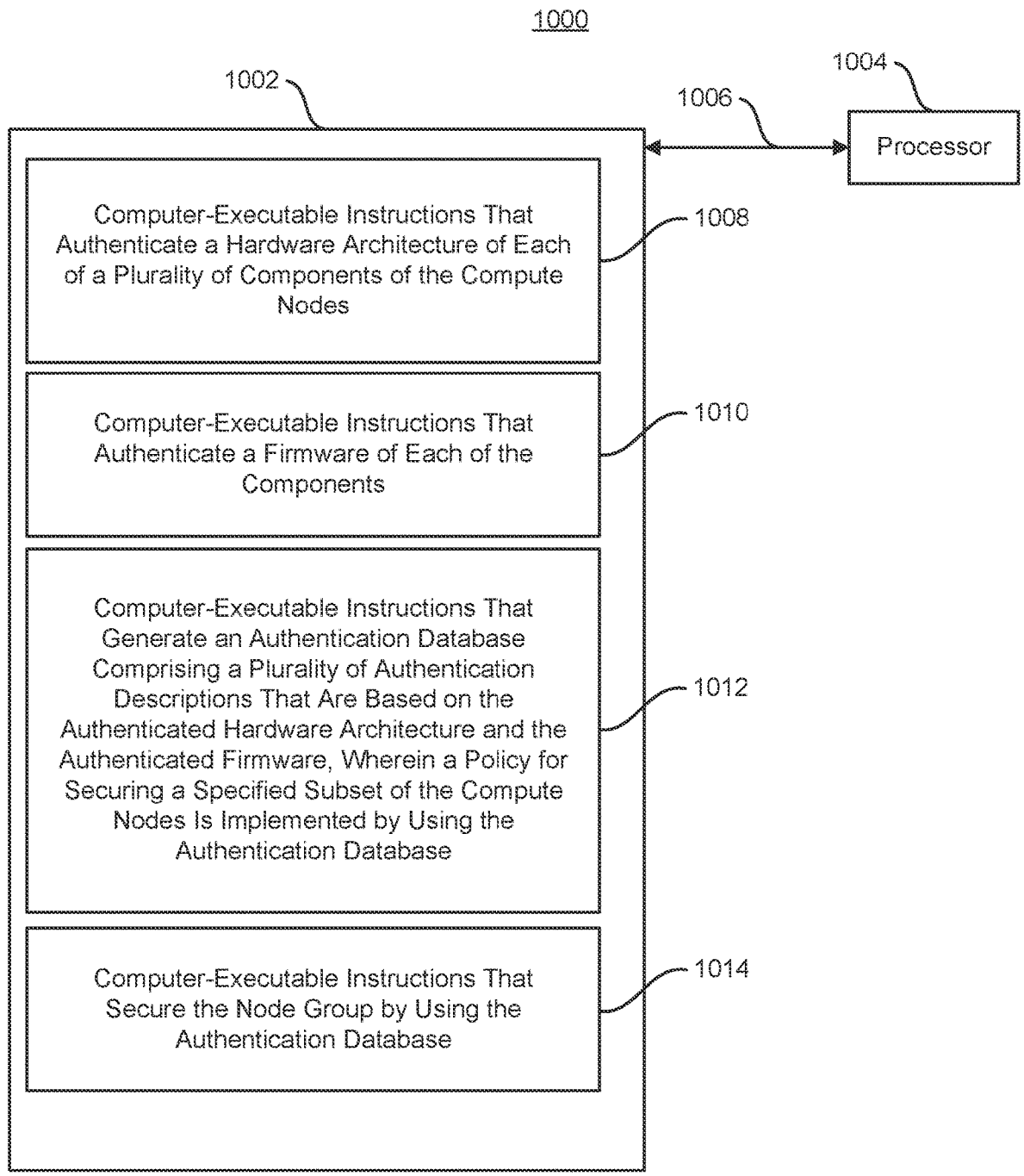
FIG. 10 is an example system comprising a tangible, non-transitory computer-readable medium that stores code for securing node groups.

FIG. 10 is an example system 1000 comprising a tangible, non-transitory computer-readable medium 1002 that stores code for securing node groups. The tangible, non-transitory computer-readable medium is generally referred to by the reference number 1002. The tangible, non-transitory computer-readable medium 1002 may correspond to any typical computer memory that stores computer-implemented instructions, such as programming code or the like. For example, the tangible, non-transitory computer-readable medium 1002 may include RAM, ROM, EEPROM, CD-ROM or other optical disk storage, magnetic disk storage or other magnetic storage components, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The tangible, non-transitory computer-readable medium 1002 can be accessed by a processor 1004 over a computer bus 1006. The processor 1004 may be a central processing unit that is to execute an operating system in the system 1000. A region 1008 of the tangible, non-transitory computer-readable medium 1002 stores computer-executable instructions that authenticate a hardware architecture of each of a plurality of components of the compute nodes. A region 1010 of the tangible, non-transitory computer-readable medium stores computer-executable instructions that authenticate a firmware of each of the components. A region 1012 of the tangible, non-transitory computer-readable medium stores computer-executable instructions that generate an authentication database comprising a plurality of authentication descriptions that are based on the authenticated hardware architecture and the authenticated firmware, wherein a policy for securing a specified subset of the compute nodes is implemented by using the authentication database. A region 1014 of the tangible, non-transitory computer-readable medium stores computer-executable instructions that secure the node group by using the authentication database.

Although shown as contiguous blocks, the software components can be stored in any order or configuration. For example, if the tangible, non-transitory computer-readable medium 1002 is a hard drive, the software components can be stored in non-contiguous, or even overlapping, sectors.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for securing a plurality of compute nodes, comprising:
   authenticating a hardware architecture of each of a plurality of components of the compute nodes;
   authenticating a firmware of each of the plurality of components; and
   generating an authentication database comprising a plurality of authentication descriptions that are based on the authenticated hardware architecture and the authenticated firmware, wherein a policy for securing a specified subset of the plurality of compute nodes is implemented by using the authentication database.

2. The method of claim 1, further comprising implementing the policy by using (i) an operation of an application program interface for authenticating compute node groups, and (ii) operating the authentication database.

3. The method of claim 1, wherein one of the compute nodes comprises a controller that is connected to the plurality of components, and wherein the controller authenticates the hardware architecture of the plurality of components and authenticates the firmware of the plurality of components, wherein the controller compares the authenticated hardware architecture and the authenticated firmware with one or more previous authentications to detect changes to the hardware architecture and the firmware.

4. The method of claim 1, wherein one of the plurality of compute nodes comprises a baseboard management controller and a computer processor, and wherein the baseboard management controller authenticates the hardware architecture of the computer processor and authenticates the firmware of the computer processor.

5. The method of claim 1, comprising generating a firmware measurement certificate for each layer of firmware of the plurality of components, wherein:
   a core root of trust generates the firmware measurement certificate for a first layer of the firmware;
   the firmware measurement certificate for the first layer of firmware specifies a trusted certification authority; and
   authenticating the firmware is based on the firmware measurement certificate.

6. The method of claim 5, wherein:
   the firmware of the plurality of components operates the plurality of components;
   the firmware measurement certificate comprises an attribute certificate; and
   the firmware measurement certificate comprises:
      a cumulative hash of the layer of firmware, wherein the cumulative hash comprises a concatenation of:
         a hash of the layer of firmware; and
         a hash of each one or more lower layers of the firmware; and
      a nonce.

7. The method of claim 6, wherein the firmware is authenticated using a trusted data store comprising a binary image of the firmware, and a certificate chain comprising a hardware digital certificate and the firmware measurement certificate.

8. The method of claim 1, wherein the plurality of compute nodes is associated with a node hierarchy level, and wherein an authentication and verification manager for the node hierarchy level performs the authentication of the hardware architecture and the authentication of the firmware.

9. A system, comprising:
a processor; and
a memory component that stores instructions that cause the processor to:
authenticate a hardware architecture of each of a plurality of components of the compute nodes;
authenticate a firmware of each of the plurality of components; and
generate an authentication database comprising a plurality of authentication descriptions that are based on the authenticated hardware architecture and the authenticated firmware, wherein a policy for securing a specified subset of the compute nodes is implemented by using the authentication database.

10. The system of claim 9, wherein the instructions cause the processor to implement the policy by (i) using an operation of an application program interface for authenticating compute node groups, and (ii) operating the authentication database.

11. The system of claim 9, wherein one of the compute nodes comprises a controller that is connected to the plurality of components, and wherein the controller authenticates the hardware architecture of the plurality of components and authenticates the firmware of the plurality of components, wherein the controller compares the authenticated hardware architecture and the authenticated firmware with one or more previous authentications to detect changes to the hardware architecture and the firmware.

12. The system of claim 9, wherein one of the compute nodes comprises a baseboard management controller and a computer processor, and wherein the baseboard management controller authenticates the hardware architecture of the computer processor and authenticates the firmware of the computer processor.

13. The system of claim 9, wherein the instructions cause the processor to generate a firmware measurement certificate for each layer of firmware of the plurality of components, wherein:
a core root of trust generates the firmware measurement certificate for a first layer of the firmware;
the firmware measurement certificate for the first layer of the firmware specifies a trusted certification authority; and
authenticating the firmware is based on the firmware measurement certificate.

14. The system of claim 13, wherein:
the firmware of the plurality of components operates the plurality of components;
the firmware measurement certificate comprises an attribute certificate; and
the firmware measurement certificate comprises:
a cumulative hash of the layer of firmware, wherein the cumulative hash comprises
a concatenation of:
a hash of the layer of firmware; and
a hash of each one or more lower layers of the firmware; and
a nonce.

15. The system of claim 14, wherein the firmware is authenticated using a trusted data store comprising a binary image of the firmware, and a certificate chain comprising a hardware digital certificate and the firmware measurement certificate.

16. A non-transitory, computer-readable medium storing computer-executable instructions, which when executed, cause a computer to:
authenticate a hardware architecture of each of a plurality of components of the compute nodes;
authenticate a firmware of each of the plurality of components; and
generate an authentication database comprising a plurality of authentication descriptions that are based on the authenticated hardware architecture and the authenticated firmware, wherein a policy for securing a specified subset of the compute nodes is implemented by using the authentication database.

17. The non-transitory, computer-readable medium of claim 16, wherein the computer-executable instructions cause the computer to implement the policy by (i) using an operation of an application program interface for authenticating compute node groups, and (ii) operating the authentication database.

18. The non-transitory, computer-readable medium of claim 16, wherein one of the compute nodes comprises a controller that is connected to the plurality of components, and wherein the controller authenticates the hardware architecture of the plurality of components and authenticates the firmware of the plurality of components, wherein the controller compares the authenticated hardware architecture and the authenticated firmware with one or more previous authentications to detect changes to the hardware architecture and the firmware.

19. The non-transitory, computer-readable medium of claim 16, wherein one of the compute nodes comprises a baseboard management controller and a computer processor, and wherein the baseboard management controller authenticates the hardware architecture of the computer processor and authenticates the firmware of the computer processor.

20. The non-transitory, computer-readable medium of claim 16, wherein the computer-executable instructions cause the computer to generate a firmware measurement certificate for each layer of firmware of the plurality of components, wherein:
a core root of trust generates the firmware measurement certificate for a first layer of the firmware;
the firmware measurement certificate for the first layer of the firmware specifies a trusted certification authority; and
authenticating the firmware is based on the firmware measurement certificate.

* * * * *